(12) United States Patent
Hartmann

(10) Patent No.: US 6,708,881 B2
(45) Date of Patent: Mar. 23, 2004

(54) READER FOR A HIGH INFORMATION CAPACITY SAW IDENTIFICATION TAG AND METHOD OF USE THEREOF

(75) Inventor: Clinton S. Hartmann, Dallas, TX (US)

(73) Assignee: RF SAW Components, Inc., Richardson, TX (US)

( * ) Notice: Subject to any disclaimer, the term of this patent is extended or adjusted under 35 U.S.C. 154(b) by 209 days.

(21) Appl. No.: 10/066,249

(22) Filed: Jan. 30, 2002

(65) Prior Publication Data

US 2003/0141366 A1 Jul. 31, 2003

(51) Int. Cl.[7] .............................. G06K 7/10; G06K 7/14
(52) U.S. Cl. ........................................ 235/454; 235/455
(58) Field of Search .............................. 235/454, 455; 340/825.34; 342/42

(56) References Cited

U.S. PATENT DOCUMENTS 5,701,127 A * 12/1997 Sharpe ...................... 340/10.2
6,121,892 A * 9/2000 Reindl et al. ................ 340/5.8
6,144,332 A   11/2000 Reindl et al.
6,208,062 B1   3/2001 Nysen et al.
2002/0005677 A1   1/2002 Reindel et al.

* cited by examiner

Primary Examiner—Thien M. Le
Assistant Examiner—Lisa M Caputo

(57) ABSTRACT

The present invention provides for a surface acoustic wave (SAW) identification tag reader and for methods of operating and manufacturing the same. In one embodiment, the SAW identification tag reader includes: (1) a transmitter capable of sending an interrogation signal that excites a SAW transducer located on a piezoelectric substrate, the piezoelectric substrate having a group of slots arranged by both pulse position and phase position, and a number of reflectors distributed among the slots such that the reflectors return to the transducer a return signal containing a number encoded by both pulse position and phase position; and (2) a receiver for detecting the return signal and decoding the number.

34 Claims, 16 Drawing Sheets

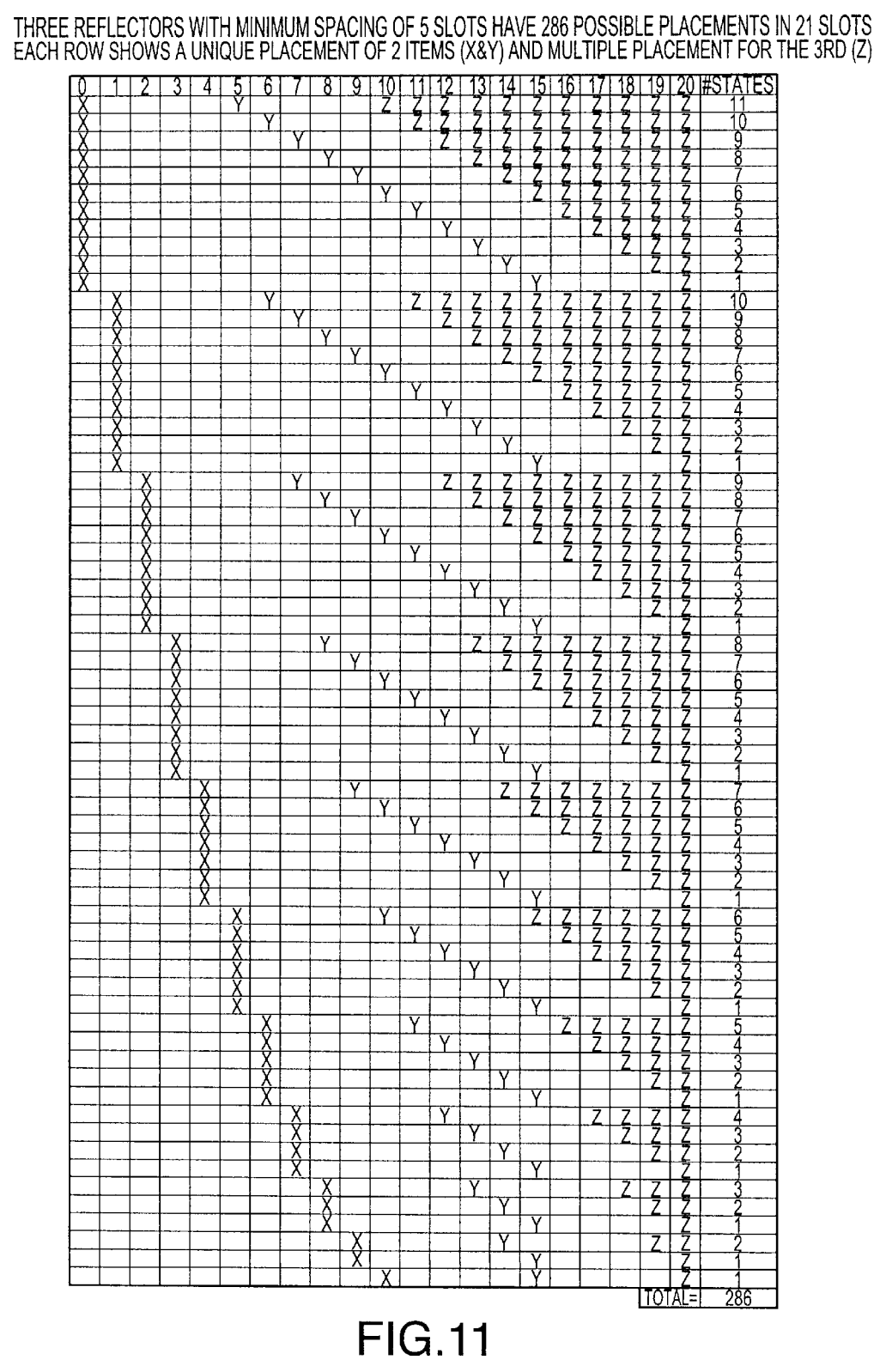

THREE REFLECTORS WITH MINIMUM SPACING OF 5 SLOTS HAVE 286 POSSIBLE PLACEMENTS IN 21 SLOTS
EACH ROW SHOWS A UNIQUE PLACEMENT OF 2 ITEMS (X&Y) AND MULTIPLE PLACEMENT FOR THE 3RD (Z)

FIG.11

IN 10 SLOTS, TWO REFLECTORS WITH MINIMUM SPACING OF 2 SLOTS HAVE 36 POSSIBLE PLACEMENTS

| STATE | 0 | 1 | 2 | 3 | 4 | 5 | 6 | 7 | 8 | 9 |
|---|---|---|---|---|---|---|---|---|---|---|
| 0 | X |   | Y |   |   |   |   |   |   |   |
| 1 | X |   |   | Y |   |   |   |   |   |   |
| 2 | X |   |   |   | Y |   |   |   |   |   |
| 3 | X |   |   |   |   | Y |   |   |   |   |
| 4 | X |   |   |   |   |   | Y |   |   |   |
| 5 | X |   |   |   |   |   |   | Y |   |   |
| 6 | X |   |   |   |   |   |   |   | Y |   |
| 7 | X |   |   |   |   |   |   |   |   | Y |
| 8 |   | X | Y |   |   |   |   |   |   |   |
| 9 |   | X |   | Y |   |   |   |   |   |   |
| 10 |   | X |   |   | Y |   |   |   |   |   |
| 11 |   | X |   |   |   | Y |   |   |   |   |
| 12 |   | X |   |   |   |   | Y |   |   |   |
| 13 |   | X |   |   |   |   |   | Y |   |   |
| 14 |   | X |   |   |   |   |   |   |   | Y |
| 15 |   |   | X | Y |   |   |   |   |   |   |
| 16 |   |   | X |   | Y |   |   |   |   |   |
| 17 |   |   | X |   |   | Y |   |   |   |   |
| 18 |   |   | X |   |   |   | Y |   |   |   |
| 19 |   |   | X |   |   |   |   | Y |   |   |
| 20 |   |   | X |   |   |   |   |   |   | Y |
| 21 |   |   |   | X | Y |   |   |   |   |   |
| 22 |   |   |   | X |   | Y |   |   |   |   |
| 23 |   |   |   | X |   |   | Y |   |   |   |
| 24 |   |   |   | X |   |   |   |   | Y |   |
| 25 |   |   |   | X |   |   |   |   |   | Y |
| 26 |   |   |   |   | X | Y |   |   |   |   |
| 27 |   |   |   |   | X |   | Y |   |   |   |
| 28 |   |   |   |   | X |   |   |   | Y |   |
| 29 |   |   |   |   | X |   |   |   |   | Y |
| 30 |   |   |   |   |   | X | Y |   |   |   |
| 31 |   |   |   |   |   | X |   | Y |   |   |
| 32 |   |   |   |   |   | X |   |   |   | Y |
| 33 |   |   |   |   |   |   | X | Y |   |   |
| 34 |   |   |   |   |   |   | X |   |   | Y |
| 35 |   |   |   |   |   |   |   | X |   | Y |

FIG.12

IN 10 SLOTS, TWO REFLECTORS WITH MINIMUM SPACING OF 3 SLOTS AND ALLOWING
ONLY ONE EVEN NUMBERED AND ONE NUMBERED SLOT PROVIDES 16 POSSIBLE STATES

| STATE | 0 | 1 | 2 | 3 | 4 | 5 | 6 | 7 | 8 | 9 |
|---|---|---|---|---|---|---|---|---|---|---|
| 0 | X |   |   | Y |   |   |   |   |   |   |
| 1 | X |   |   |   |   | Y |   |   |   |   |
| 2 | X |   |   |   |   |   |   | Y |   |   |
| 3 | X |   |   |   |   |   |   |   |   | Y |
| 4 |   | X |   |   | Y |   |   |   |   |   |
| 5 |   | X |   |   |   |   | Y |   |   |   |
| 6 |   | X |   |   |   |   |   |   | Y |   |
| 7 |   |   | X |   |   | Y |   |   |   |   |
| 8 |   |   | X |   |   |   |   | Y |   |   |
| 9 |   |   | X |   |   |   |   |   |   | Y |
| 10 |   |   |   | X |   | Y |   |   |   |   |
| 11 |   |   |   | X |   |   |   |   | Y |   |
| 12 |   |   |   |   | X |   | Y |   |   |   |
| 13 |   |   |   |   | X |   |   |   |   | Y |
| 14 |   |   |   |   |   | X |   | Y |   |   |
| 15 |   |   |   |   |   |   | X |   |   | Y |

FIG.13

READER FOR A HIGH INFORMATION CAPACITY SAW IDENTIFICATION TAG AND METHOD OF USE THEREOF

TECHNICAL FIELD OF THE INVENTION

The present invention is directed, in general, to a SAW identification tag reader and, more specifically, to a reader for use with surface acoustic wave (SAW) identification tags having enhanced data content and to methods of operating and manufacturing the same.

BACKGROUND OF THE INVENTION

Familiar to all are the bar codes and magnetic strips employed by businesses to perform identification functions and the various devices used to read them. Generally, magnetic strips are read by swiping a card with the strip on it, such as a credit card, through a reader. Magnetic strips can also read by contact or proximity devices where the card, such as a parking or access card, is placed on or held close to the reader. Bar codes are most generally read by using a "light gun" to read the code and identify the item associated with that particular code. The main reason bar codes and magnetic strips are the identification systems of choice is that they are very cheap.

The applications for which bar codes and magnetic strips are useful is limited, however, by the relatively small amount of data they can encode and their inherent readability limitations. One such readability limitation is the range at which they can be used. Both are short range systems that require the reader to contact or be very close (a few centimeters, at most) to the bar code or magnetic strip, as the case may be, in order to decode data. They are also limited by the fact that no obstruction can be between the reader and the bar code or magnetic strip for the reader to accurately decode data. The orientation of the reader relative to the bar code or magnetic strip can also be a significant readability problem. If the reading device is not properly aligned or is held at an incorrect angle, the encoded information can not be read. As a result of these problems, each individual read operation requires manual scanning by a human operator if high read accuracy is needed. The various limitations of bar codes and magnetic strips have prevented their use in a wide range of applications for machine readable tags that need highly reliable and totally automated reading at read ranges up to several meters.

The radio frequency identification ("RFID") tag is another prior art identification device. As the name suggests, when RFID tags are interrogated they reflect or retransmit a radio signal that returns encoded identification information. RFID tags have many uses, ranging from the collection of highway and bridge tolls to being embedding in objects to circumvent counterfeiters. An advantage of RFID tags over magnetic devices and bar codes is that they can generally be sensed at a somewhat longer distance without having as significant line-of-sight and orientation problems that are evidenced in bar code and magnetic strip systems. Although RFID tags have a longer reliable range than the ubiquitous magnetic strip and bar code systems, the range at which they can reliably operate is still a limiting factor.

Prior art RFID tag devices are of two basic types; those that contain a microchip and those that do not. There is a radical difference in cost and performance between the two types; to such an extent that they rarely compete with one another as to type of use. As a general rule, chip tags cost more by have a larger data capacity than chipless tags. Chip tags, for example, are usually not available below a unit cost of about one dollar each when ordered in a quantity of less than one million; whereas many chipless tags are projected to cost less than 20 cents each, even when ordered in quantities of one hundred thousand.

Chip tags are by far the most popular. A chip tag consists of four elements or features: (1) a computer microchip; (2) circuits for converting radio signals to computer data signals and back to radio signals; (3) an antenna; and (4) a means for providing DC power to the chip circuitry. In low cost RFID chip tags, the first two features are often partially or totally integrated into a single microchip, which integration requires certain compromises in tag performance (read range, number of bits, etc.). This combination of features also leads to certain integrated circuit (IC) cost and/or design compromises to accommodate both digital and radio frequency circuitry on a single IC. The impact of these design compromises can be partially compensated for by use of low radio frequency (RF) operating frequencies that, in turn, lead to rather large and expensive antennas.

The most daunting problem with chip tags is the need for DC power for the chip circuitry. The combination of environmental issues coupled with severe constraints on cost, size and weight usually requires that the tag not have a battery or other on-board power source. The only generally useable solution is to obtain DC power by converting RF power received from the tag reader signal into DC power within the tag. Those skilled in the pertinent art term tags without a battery or other power source as "passive" tags, while those that contain a battery or other source are termed as "active" tags. The passive method of providing DC power to a chip tag requires a more efficient tag antenna (i.e., larger size and cost) and higher transmitted power levels from the reader. It also requires added components which will either add to the cost of the microchip or to the cost of the tag for the required extra electrical components in the tag, which additional components will also result in an increased tag size. The most important limitation of passive powered chip tags, however, is the severe restriction on the read range of the tag because a signal that is sufficiently strong to power the tag only extends a short distance from the tag reader antenna. Thus, while chip tags have the dominate share of the RFID market, the high cost and limited read range combine to prevent chip tags from replacing either bar codes or magnetic strips in any significant manner.

"Chipless" RFID tags do not contain a microchip but, instead, rely on magnetic materials or transistorless thin film circuits to store data. A major advantage of chipless RFID tags is their relatively low cost. The disadvantages of chipless tags include that they are range limited (several centimeters at the most) and only contain limited amounts of information. The severity of these problems has prevented their market acceptance in spite of their low cost potential.

In the year 2000, the current global market for conventional RFID systems and services is in the order of 500 million U.S. dollars. This market is largely for chip tags that typically cost from about one dollar to tens of dollars each. While chipless tags are not selling well, they have generated great interest from a number of potential users because of their low cost potential. A huge gap exists in the automatic identification market between the very low cost bar codes and the higher performing RFID chip tags. The overall market is clamoring for a technical solution to fill that gap. The critical characteristics of the new automatic identification technology to fill this gap are: (1) a cost of between one cent and ten cents per tag when manufactured in high quantities; (2) reliable reading without the need for manual scanning by a human operator; (3) reliable reading without a line of sight between the tag and tag reader (i.e., reliable reading even if the tag is scratched, or covered with dirt, or on the wrong side of the package, etc.); (4) a reliable read range of at least one to two meters; and (5) a tag data capacity of roughly 100 bits. Such tags are of vital interest to postal authorities, airlines and airports, mass transit authorities, animal breeders, the livestock industry, delivery businesses, any business with significant supply chains, particularly those that maintain inventory or handle fast moving consumer goods, and so on. These are all applications where a high priced tag is not practicable, particularly where the tag is disposable or is going to be sold with the product.

To address and overcome the limitations of cost, data capacity and reliable range inherent in prior art RFID tags, a new type of RFID tag has been developed. These tags are the SAW identification tags that are described in detail in U.S. patent application Ser. No. 10/024,624, entitled "Surface Acoustic Wave Identification Tag Having Enhanced Data Content and Methods of Operation and Manufacture Thereof," by Hartmann, commonly assigned with the invention and incorporated herein by reference. In order for the SAW identification tags described by Hartmann to be of use, however, it is essential that a reliable reader capable of sending an interrogation signal and receiving and decoded a reply signal be provided for use with such tags.

Accordingly, what is needed in the art is a SAW identification tag reader that can reliably interrogate a SAW identification tag with substantial data encoded thereon and that can reliably detect and decode such tag's return signal.

SUMMARY OF THE INVENTION

To address the above-discussed deficiencies of the prior art, the present invention provides for a SAW identification tag reader and for methods of operating and manufacturing the same. In one embodiment, the SAW identification tag reader includes: (1) a transmitter capable of sending an interrogation signal that excites a SAW transducer located on a piezoelectric substrate, the piezoelectric substrate having a group of slots arranged by both pulse position and phase position, and a number of reflectors distributed among the slots such that the reflectors return to the transducer a return signal containing a number encoded by both pulse position and phase position; and (2) a receiver for detecting the return signal and decoding the number.

The present invention thus introduces a reader for use with SAW identification tags where the SAW identification tag is constructed to use both phase positions and pulse positions to return an encoded number. By using both phase position and pulse position encoding methods a dramatic increase in the amount of data that a SAW identification tag can contain is achievable. Such increase permits a SAW identification tag to contain a globally unique number, thus permitting the use of such tags for uniquely and reliably identifying and tracking a heretofore unprecedented number of objects. The present invention provides a reader to reliably interrogate such SAW identification tags and accurately decode a number encoded in the return signal under a variety of different environmental conditions.

In one embodiment of the present invention, the reader is used to transmit interrogation signals to, and detect and decode return signals from, a SAW identification tag where reflectors are arranged such that said phase position is in quadrature. In another embodiment, a framing reflector is located between the SAW transducer and the group.

In one embodiment of the present invention, the SAW identification tag reader can read a SAW identification tag that encodes a number that is at least eight bits long. Another embodiment provides for a SAW identification tag reader for use with SAW identification tags that have a plurality of groups separated by dead spaces. In still another embodiment, the SAW identification tag reader can read a SAW identification tag that has at least four groups and encodes a number that is at least 32 bits long. In yet another embodiment, the SAW identification tag reader can read a SAW identification tag that has at least twelve groups and encodes a number that is at least 64 bits long.

A particularly useful embodiment provides for a SAW identification tag reader that uses an interrogation signal that has a frequency of between two and three gigahertz. A particularly advantageous application of this embodiment provides for a 2.45 gigahertz frequency.

A most useful embodiment of the SAW identification tag reader provides for reading a SAW identification tag containing data pertaining to an object associated with the number. This feature permits groups of numbers to be uniquely associated with specific kinds of objects. For example, a certain predetermined block of SAW identification tag numbers can be associated with beef cattle while another block can be associated with automobile parts.

The utility of the SAW identification tag reader is enhanced by an embodiment of the invention that is further comprised of having a computer associated with it. Another aspect of the invention is further comprised of having the SAW identification tag associated with a computer network.

The present invention encompasses a wide array of SAW identification tag reader embodiments. In an embodiment to be illustrated and described, the SAW identification tag reader is selected from the group consisting of a side panel reader, a shelf reader, a doorway reader, a roadway reader, a short range hand-held reader, a long range hand-held reader, a long range fixed reader, a wand reader and a fingertip reader.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 11 illustrates a table showing the 286 possible states that exist when three reflectors are used in a group of 21 slots having a skip factor of four;

FIG. 12 illustrates a table showing the states for a SAW RFID tag with 10 slots, two reflectors and 36 possible placements;

FIG. 13 illustrates a table showing one sub-group of state from a SAW RFID tag with four reflectors per group, 20 slots per group, a skip factor of three, a phase increment between adjacent slots ±90° with division into 2 sub-groups and only one reflector of each specific phase per group;

DETAILED DESCRIPTION

Figure 1:
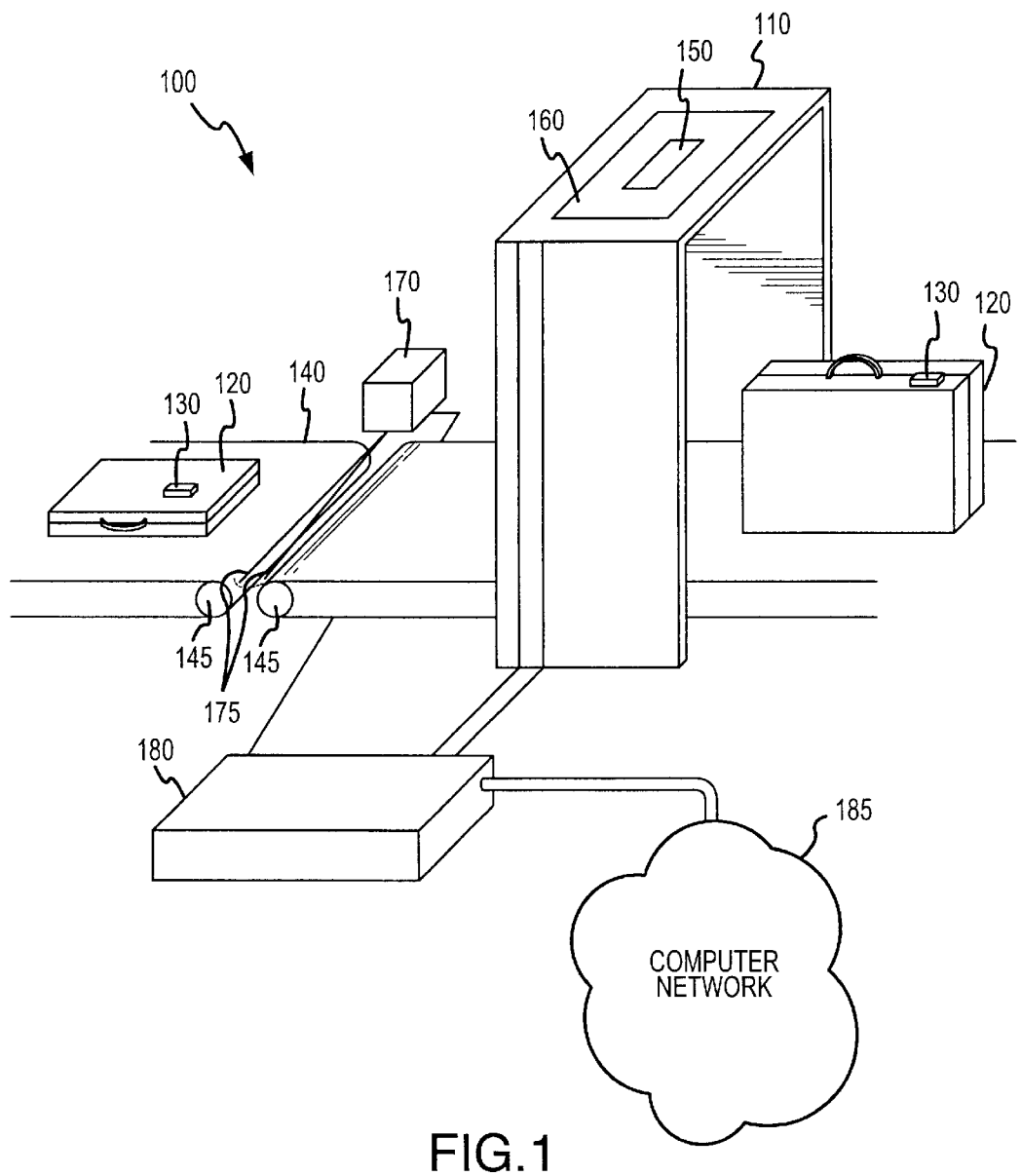
FIG. 1 illustrates an isometric side view of a baggage handling machine that is presented as an example of an embodiment of a SAW identification tag reader constructed in accordance with the present invention.

Referring initially to FIG. 1, illustrated is an isometric side view of a baggage handling machine 100, that is presented as an example of an embodiment of a SAW identification tag reader 110 constructed in accordance with the present invention. Each object to be identified, such as items of baggage 120, has a SAW identification tag 130 associated with it. To reliably identify the object, a SAW identification tag 130 must have sufficient data capacity to reliably identify an object with particularity. If the SAW identification tag 130 has the requisite data capacity, the reader 110 will interrogate the tag 130 by transmitting an interrogation signal, detect a return signal and decode the globally unique identification number that is encoded in such return signal. SAW identification tags 130 with sufficient data capacity to encode a globally unique identification number suitable for use with the present invention are described in detail in U.S. patent application Ser. No. 10/024,624, entitled "Surface Acoustic Wave Identification Tag Having Enhanced Data Content and Methods of Operation and Manufacture Thereof," by Hartmann, commonly assigned with the invention and incorporated herein by reference.

A baggage handling machine 100 of the type illustrated could be beneficially used by an airline or bus company in conjunction with SAW identification tags 130 such as that described in Hartmann. Those of ordinary skill in the pertinent art will recognize that several configurations of baggage handling machines 100 could be constructed and used, and be within the intended scope of the present invention. As items of baggage 120 are moved through the reader 110 on a conveyor belt 140, a transmitter 150 transmits an interrogation signal to each SAW identification tag 130 that is associated with an item of baggage 120. Each of the SAW identification tags 130 respond to the interrogation signal by transmitting a return signal with its own globally unique identification number encoded therein. A receiver 160 in the reader 110 detects the return signal and decodes the number which enables the user to identify the item of baggage 120 with particularity.

In most cases baggage 120 will be placed on the conveyor belt 140 with the SAW identification tag 130 in a position where it can be read by the reader 110. In some cases, however, the SAW identification tag 130 will be located in a position where the baggage 120 constitutes an obstacle between the SAW identification tag 130 and the reader 110. Although a reader 110 may be robust enough to detect a tag 130 in such a position, inevitably some items will be so thick or made of a substance that the interrogation signal or the return signal will be blocked. To read tags 130 blocked in such a fashion, the illustrated machine 100 provides for a back up proximity SAW identification tag reader 170. The proximity SAW identification tag reader 170 generates an interrogation signal and detects and decodes a return signal from a SAW identification tag 130. The major difference between the standard reader 110 and the proximity reader 170 is the way the interrogation signal is generated and detected. In the case of a standard reader 110 a signal is radiated signal through the air by the reader 110 that is processed and returned from the tag 130 as a return signal that is also radiated through the air. In the case of the proximity reader 170, the outgoing signal from the reader 170 is not radiated. Instead, electric and magnetic fields are created near the wires 175 that couples to/from a tag 130 only when the tag 130 is in proximity to the wires 175.

The illustrated embodiment of a proximity SAW identification tag reader 170 has two wires 175 located so they span the conveyor belt 140 by being located between rollers 145 where two sections join together. An electrical current in the wires 175 generate a surrounding electric or magnetic field sufficient to excite the transducer on the SAW tag 130 into producing an interrogation signal when the tag 130 crosses the wires 175. A return signal is then detected and decoded by the proximity SAW identification tag reader 170. Those skilled in the pertinent art will readily ascertain that a number of suitable applications exist for using a proximity SAW identification tag reader 170 of the type described, all of which are well within the intended scope of the invention.

After the identification number on a SAW identification tag 130 associated with a baggage 120 item is ascertained, the information is transferred to a computer 180 associated with the reader 110. This information can then be used to facilitate handling the baggage 120 by, for example, generating handling instructions such as routing, loading, unloading or delivery. In another useful embodiment of the invention, the reader 110 is associated with a computer network 185. Such a computer network 185 can be a Local Area Network ("LAN"), a Wide Area Network ("WAN"), an intranet, an extranet, the Internet or any combination thereof.

In a typical computer network 185 there will generally be at least one server with a database designed to perform specific designated tasks, such as receiving, retrieving, updating and disseminating information. The present invention provides for information to be supplied to the database by a reader 110 that interrogates and reads SAW identification tags 130. In addition to a server, most computer networks 185 have a variety of conventional interface devices, such as personal computers, workstations, office computer systems and laptop computers. In addition to conventional interface devices, computer networks 185 can also include personal digital assistants and individually addressable vehicles ("IAV"). An IAV can be any instrument capable of certain computer functions that is combined with a wireless receiver and/or transmitter and that is individually addressable. An IAV could, for example, be used by a baggage handler on the airport tarmac to communicate with the computer network 185.

Figure 2:
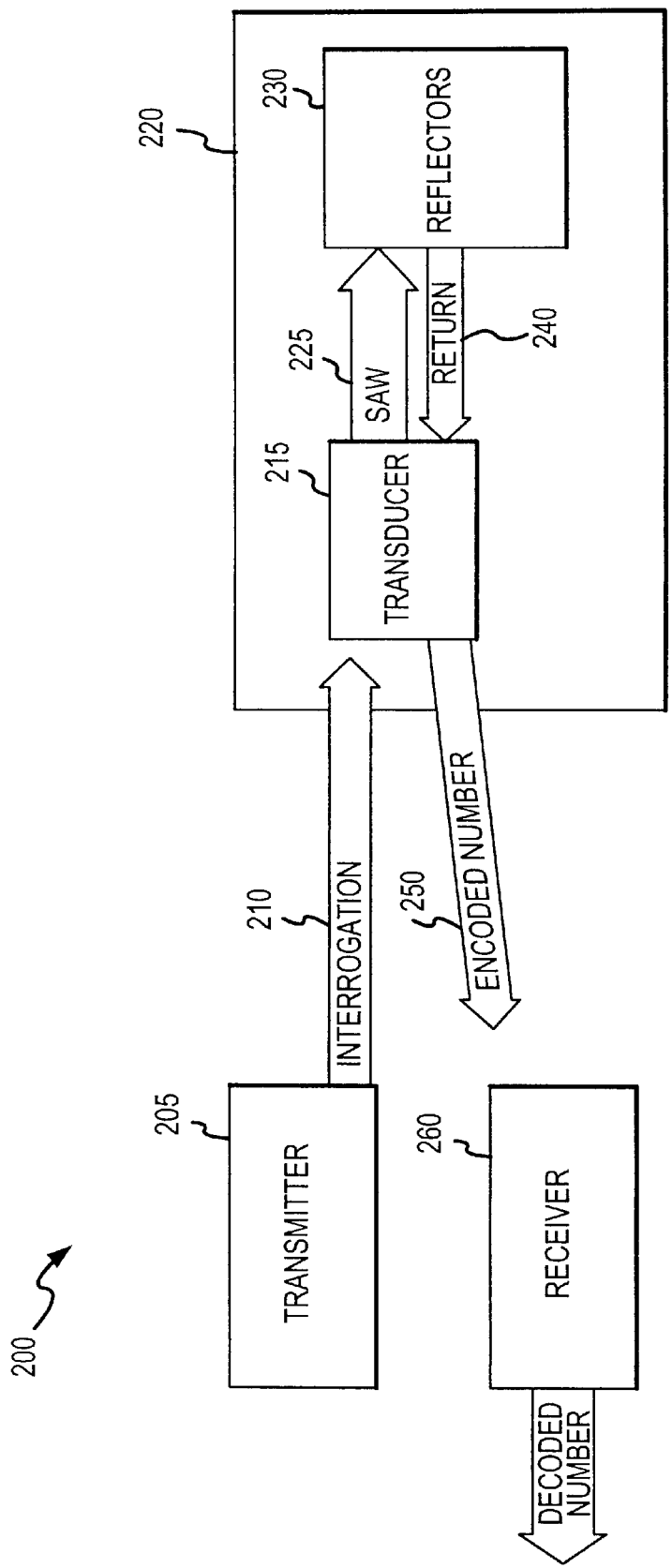
FIG. 2 illustrates a block diagram of an embodiment of a SAW identification tag reader constructed in accordance with the present invention.

Turning now to FIG. 2, illustrated is a block diagram of an embodiment of a SAW identification tag reader 200 constructed in accordance with the present invention. A transmitter 205 on the reader 200 sends an interrogation signal 210 that is received by a SAW transducer 215 on a piezoelectric substrate 220 of the SAW tag. The interrogation excites the SAW transducer 215 which sends a SAW signal 225 down the substrate 220. As hereinafter described in detail, on the surface of the substrate 220 are a group of slots arranged by both pulse position and phase position. A number of reflectors 230 are distributed among the slots and arranged by both pulse position and phase position to generate a return signal 240 to the transducer 215 with a number 250 encoded therein. A receiver 260 in the reader 200 detects the return signal 240 and decodes the number 250.

Figure 3A:
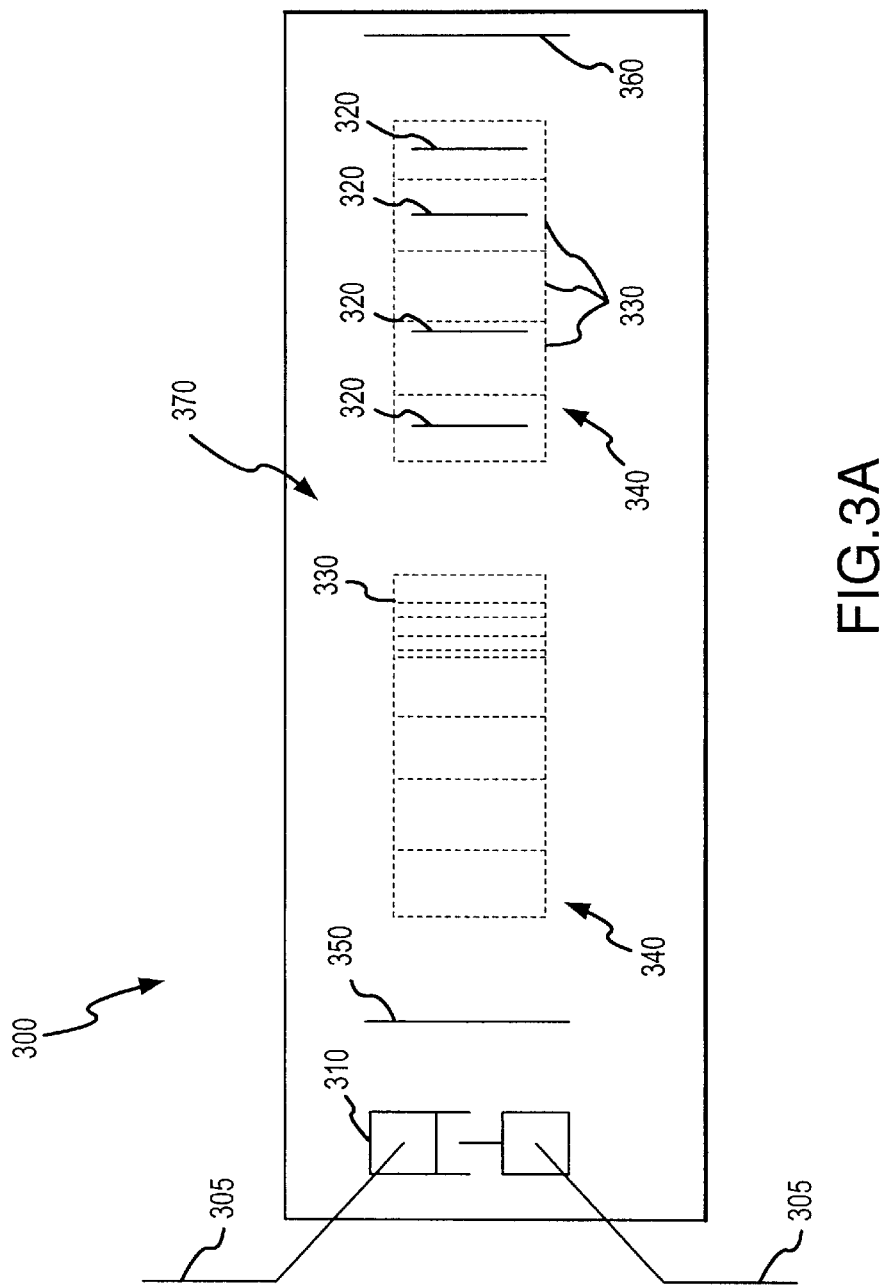
FIG. 3A illustrates a plan view of an embodiment of a SAW identification tag with an antenna configured to provide a return signal with a specific number encoding therein by both pulse position and phase position.

Turning now to FIG. 3 illustrated is a plan view of an embodiment of a SAW identification tag 300 with an antenna 305 configured to provide a return signal with a specific number encoding therein by both pulse position and phase position. The SAW tag 300 has a transducer 310 at one end where an antenna 305 is used to receive an interrogation signal from the SAW tag reader. A SAW is generated that proceeds down the surface of the SAW tag 300 and encounters reflectors 320 arranged by both pulse position and phase position so that the return signal will have a number encoded therein that is uniquely associated with the interrogated SAW identification tag 300.

Located on the surface of the SAW identification tag 300 are one or more groups 340 of slots 330 that are arranged by pulse position and phase position. Of course they could also be arranged by pulse position, phase position and amplitude position and still be within the intended scope of the present invention. The number of slots 330 and their arrangement is dependent on the encoding system being used. A particularly useful embodiment of the invention provides for the reflectors 320 to be arranged such that the phase position is in quadrature. Those of ordinary skill in the pertinent art will understand that other embodiments of the invention may use different phase positions requiring different arrangements of slots 330 within a group 340 as well as a different number of slots 330 and groups 340 and still be well within the intended scope of the present invention.

In one embodiment of the invention, the SAW identification tag reader is used with SAW tags 300 that have a framing reflector 350 located between the transducer 310 and the group 340 of slots 330. Such a framing reflector 350 can be regarded as the starting point in the return signal where the SAW identification tag reader can start detecting a coded identification number. In another embodiment an end reflector 360 is located on the SAW tag 300 after the group 340 or groups 340 of slots 330. The end reflector 360 together with the framing reflector 350, serve to frame a return signal for the SAW identification tag reader to decode. The illustrated embodiment also shows a dead space 370 separating each group 340. This dead space 370, while not necessary to the present invention, serves to separate groups 340 and decrease inter-symbol interference.

To understand the arrangement of reflectors 320 on a SAW tag 300 and the return signal that have a unique number encoded therein, it is helpful to consider relevant signal modulation methods. In conventional pulse position modulation (PPM) a data stream can be coded by dividing it into separate sample values where a single pulse is used to transmit information contained in a sample. Changing the time position of that single pulse over a predetermined span of time serves to transmit the information in that sample. Single pulses in subsequent time spans are similarly used to transmit information in subsequent sample values.

Figure 4:
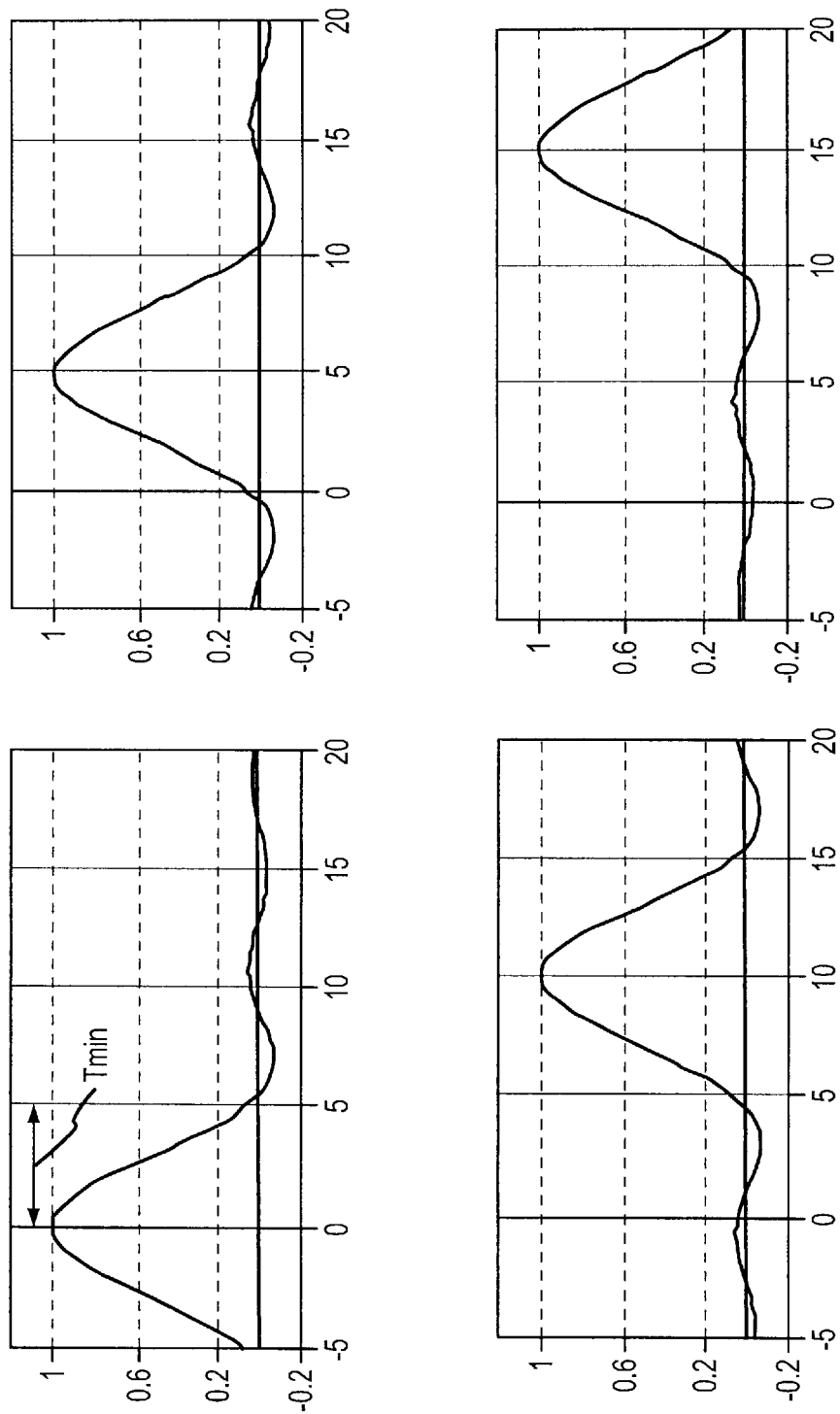
FIG. 4 illustrates an example of digital PPM showing four positions of a time span for transmitting data using conventional PPM.

Turning now to FIG. 4, illustrated is an example of digital PPM showing four pulse positions of a time span where data can be transmitted using conventional PPM. In this case, the sample to be transmitted is digital and has one of four possible values. Shown are four possible waveforms which consist of nominally identical single pulse waveforms whose time positions can be centered in one of four time locations or pulse positions. The minimum time spacing required between pulse positions to ensure that skirts from neighboring pulse positions are essentially zero at the peak of any selected pulse is Tmin. Of course, pulse spacing wider than Tmin can be used without affecting the ability to demodulate a PPM signal, however, if pulses positions are spaced more closely than Tmin, it becomes more difficult to unambiguously distinguish one pulse position from its neighbor. Using a reader to sampling the PPM waveform at each of the four possible peak pulse positions and selecting the largest one results in the demodulation of conventional PPM. It is readily apparent to those of ordinary skill in the relevant art that the demodulation process must be synchronized using one of a number of synchronization methods known in the art.

The four possible pulse positions represent two binary bits of data. A subsequent group of four pulse positions occupied by a single pulse can represent an additional two binary bits of data. As many sequential groups of four pulse positions as necessary can be used to represent a desired data word containing many bits of information.

PPM modulation is a favored modulation method for RFID tags based on SAW devices, because (1) a single pulse can be readily created and programmed by a SAW reflector placed on the SAW substrate, (2) the various pulse time positions directly relate to the spatial place of possible SAW reflectors, (3) the number of data bits is greater than the number of signal pulses which reduces tag insertion loss and (4) the number of SAW reflectors remains constant for all possible tags identification numbers which leads to reasonably low loss tags with uniform pulse amplitudes for any tag identification. However, the use of PPM for SAW RFID tags also has limitations including: (1) PPM data density is low, which increases the chip size (and hence cost); (2) the low data density combined with practical maximum sizes for SAW chips creates an upper limit on the number of bits for practical tags; and (3) multi-bounce reflections between the various reflectors in a PPM SAW tag create unwanted pulses that can interfere with later portions of the PPM pulse train.

In FIG. 4, Tmin is defined as a slot representing a time length centered on any of the possible pulse positions. A group is represented by a collection of adjacent slots. The example in FIG. 4, shows one group with four states that represent two binary data bits. If four groups of four slots are used there are 256 possible states (or combinations) as given by 4 states×4 states×4 states×4 states=256 states. This corresponds to eight bits of data (or four times more data than a single group). These 256 states (eight bits of data) occupy a total of 16 slots. If these 16 slots are combined into a single group and conventional PPM method is used, one pulse would occupy one of the 16 slots. The available 16 states (four bits of data) is significantly smaller than the 256 states that would result from using the same 16 slots in four separate groups with four slots each.

If conventional PPM concepts are set aside and multiple pulses are allowed in a single group, the number of states is significantly increased. For example, if four pulses are allowed to occupy any four positions in a group of 16 slots, 1,820 states exist which is significantly more than the 256 states available by using the more conventional PPM of four groups of four slots (which would occupy the same 16 slots). Further, if eight pulses are used in the group of 16 slots, 12,870 states are available, which is an even bigger improvement. If seven, eight, or nine pulses in a group of 16 slots are allowed, 35,750 states are possible which corresponds to more than 15 bits of data compared to the eight bits of data if conventional PPM was used in the same space.

Once multiple pulses are allowed in a single group, it is not proper to describe the modulation format as PPM. A more suitable name for this new method is multiple pulse per group keying (MPGK)where keying is the equivalent of modulation. There are several important possible variants of MPGK. This new method is defined by (1) partitioning a data stream to be transmitted into one or more separate sample values; (2) using more than one (i.e., multiple) pulses to transmit a given sample value; (3) transmitting the more than one pulses in a span of time that is divided into time slots which are nominally but not necessarily adjacent; (4) the collection of the time slots comprising the span of time constitute a group of slots; and (5) distributing the multiple pulses among the group of slots in a predetermined manner to represent the information contained in the separate sample value. Groups can vary in the number of slots and/or in the number of occupied slots. All slots do not have to be identical (unequal slot widths, pulse amplitudes, etc. are allowed) nor do slots have to necessarily be adjacent to one another. A single group can be defined such that it only has a fixed number of occupied slots or, alternatively, it might allow for a varying number of occupied slots. A single data message could include more than one type of group (for example a header might be one type of group, the actual data a second type of group, synchronization a third, and an error detection/correction might be a fourth). All of these variants have particular usefulness in SAW RFID tags. Such variants are all within the scope of this invention.

Figure 5:
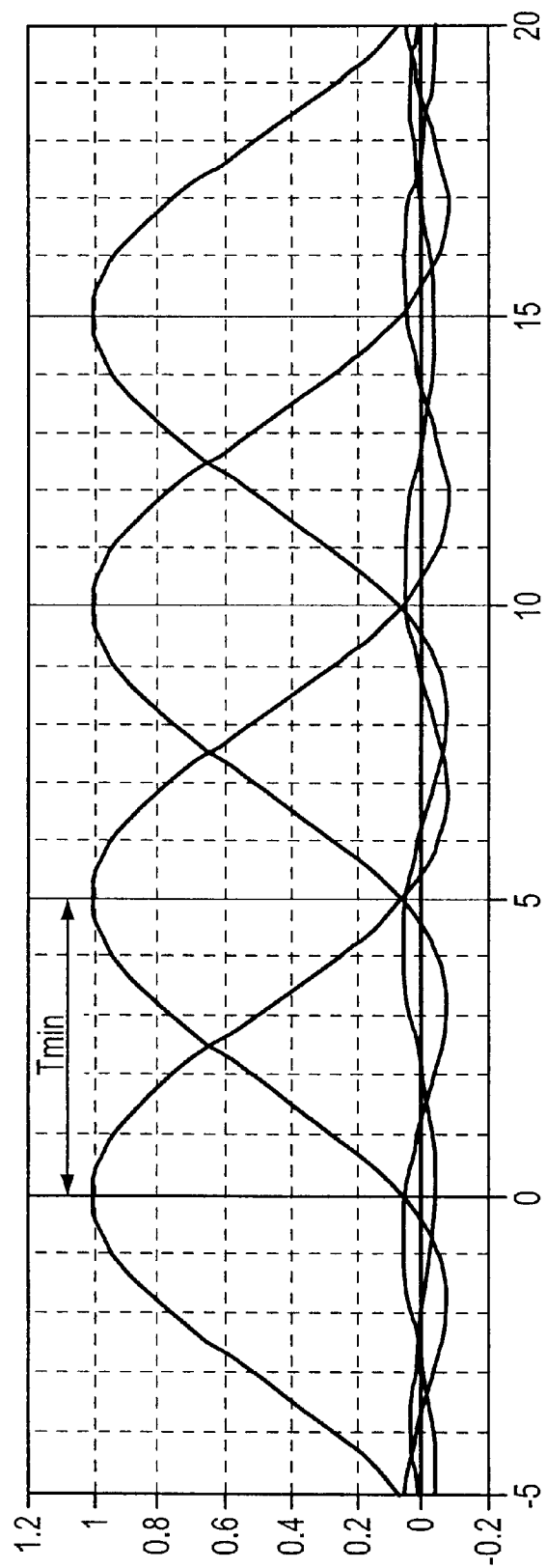
FIG. 5 illustrates an example of one embodiment of the invention showing pulse positions for a conventional four state digital PPM.

Turning now to FIG. 5, illustrated is an example of one embodiment of the invention showing pulse positions for a conventional four state digital PPM. In its simplest implementation, the modulation method covered by the present invention uses a single pulse per group similar to conventional PPM. The example in FIG. 5 is a compact representation of the allowable pulse positions in a group with four slots with Tmin being the time separation between the allowable pulse peak positions. In PPM only one of these pulses is transmitted in this group and if the demodulation sampling is done at the allowable peak positions, three of the samples will be essentially zero and the correct sample will have amplitude of unity. If sampling during demodulation is not properly synchronized to the peak positions, then the amplitude for the "correct pulse" location will start decreasing while the amplitude at a neighboring location will become larger than zero. However, the signal can still be correctly demodulated. If noise was also present in the system, then the probability of incorrect demodulation will be increased due to this timing error. However, if the timing error is small, the degradation is negligible. In principle, if the signal to noise ratio is sufficiently small, the signal can still be successfully demodulated as long as the timing error is less than Tmin/2.

The ability to successfully distinguish between two possible positions of a single pulse even when the pulses are partially overlapped can be used to increase the data density at the expense of signal to noise ratio sensitivity. This increase in data density is achieved by moving the allowable pulse positions closer together in a manner that the skirt of one allowable pulse position will overlap with the peaks of the neighboring pulse positions.

Figure 6:
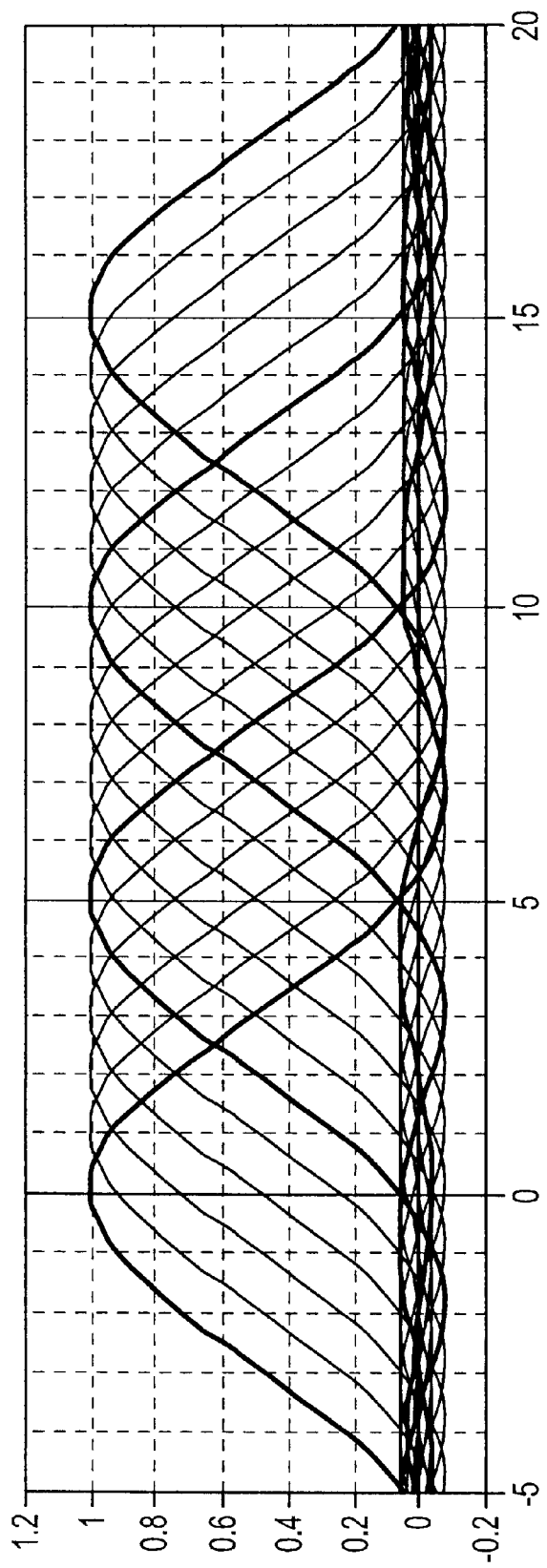
FIG. 6 illustrates an example of allowable pulse positions with significant overlap.

Turning now to FIG. 6, illustrated in an example of a allowable pulse positions with significant overlap. The allowable pulse spacing has been reduced to one unit as compared to the five units shown in FIG. 5. In this case, the slot width is equal to Tmin/5 and thus potentially represents a five-fold increase in the number of states. This method for increasing data density is rarely used because of the obvious reduction in the detection margin for distinguishing neighboring pulse positions.

Figure 7:
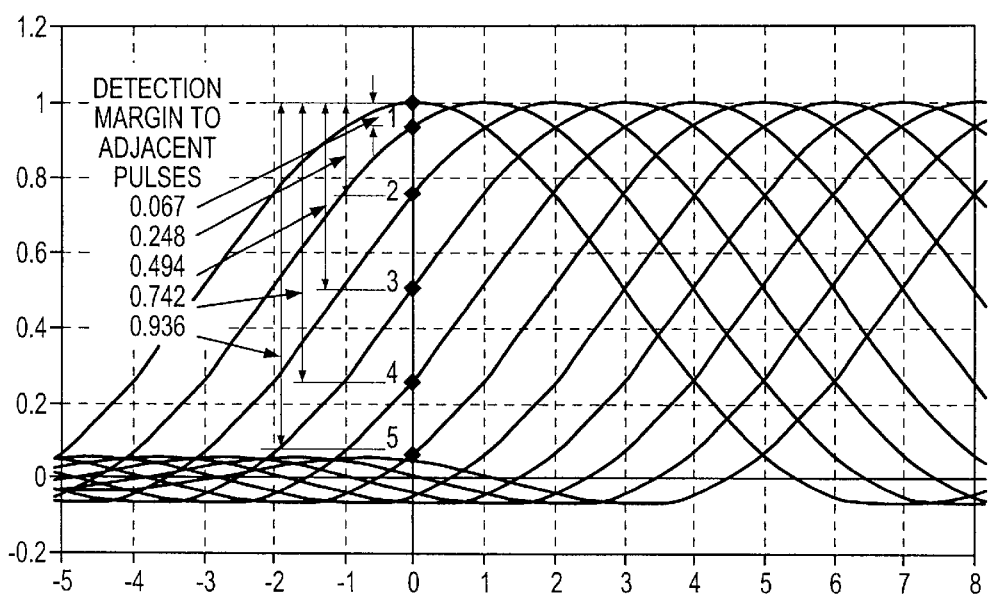
FIG. 7 illustrates the details of one embodiment of pulses with a five-fold increase in the number of states that has a limited detection margin.

Turning to FIG. 7, illustrated are the details of one embodiment of pulses with a five-fold increase in the number of states that has a limited detection margin. To demodulate a signal with the strongly overlapping pulses shown in FIG. 7, it would be necessary to sample the received signal at the peak locations of all possible pulse positions (i.e., at all integer locations on the horizontal axis in FIG. 7). As is evident from FIG. 7, discrimination is particularly poor with respect to the adjacent pulse positions, but this discrimination increases for next adjacent pulse, third adjacent pulse, etc. The present invention provides for a novel modulation format as described herein. The allowable pulses are modified such that each pulse not only has a different time position but also an added phase step between each adjacent pulse. For example, if a phase step of ±90° is added between each adjacent pulse, then the pulse at t=0 (time equals zero) might have 0°, the pulse at t=1 will have ±90°, the pulse at t=2 will have ±180°, the pulse at t=3 will have ±270°, the pulse at t=1 will have ±360°, etc.

Figure 8A:
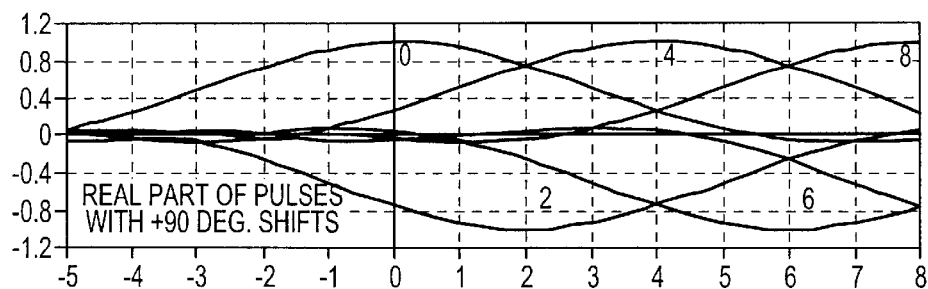
FIGS. 8A and 8B illustrate the real and imaginary parts of overlapping pulses with an added phase shift of +90°.
Figure 8B:
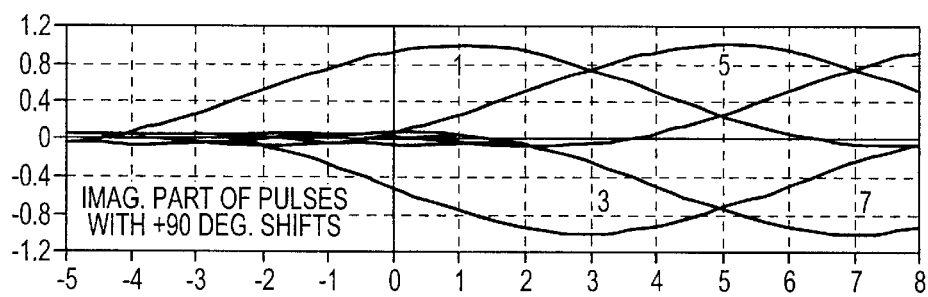

Turning now to FIGS. 8A and 8B, illustrated are the real and imaginary parts of overlapping pulses with an added phase shift of +90°. Because phase multiples of 90° are used in the illustrated embodiment, the odd numbered pulses (1, 3, 5, etc.) have real parts equal to zero and the even numbered pulses have imaginary parts equal to zero. A wide range of phase angles can be used, many of which can give equal or better performance than this particular 90° case. For example, a stepping angle could vary by more than ±20° without any significant degradation.

To demodulate the signal in FIG. 8, it would be necessary for the SAW identification tag reader to sample the real part of the received signal at the peak locations (t=0, 1, 2, etc.)as well as shifting the phase of the sampling signal from one time slot to the next such that it would agree with the expected phase of a pulse if it should occur at that slot locations.

Figure 9:
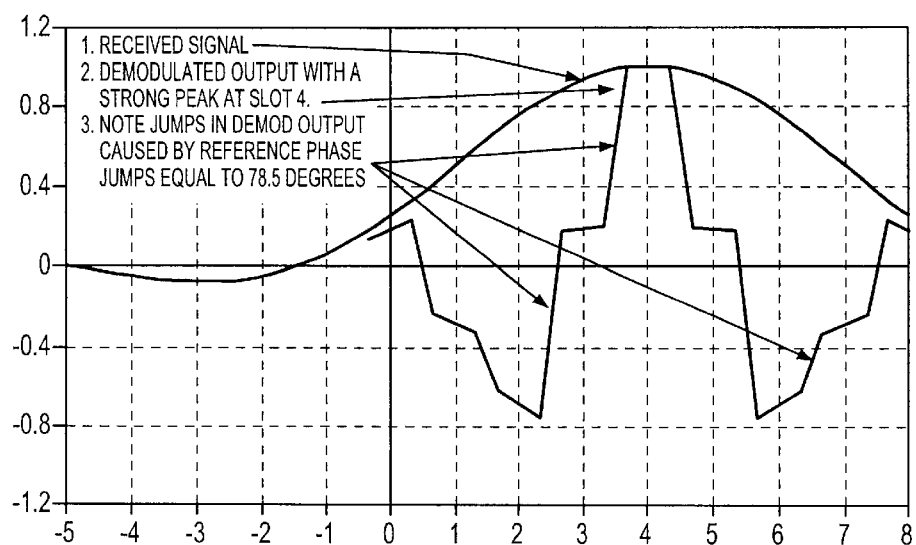
FIG. 9 illustrates an embodiment of the invention where a phase increment other than 90° is used with substantially improved discrimination between the correct state and the neighboring states where the allowable pulse spacings are Tmin/5 and a 78.5° phase difference between adjacent allowed states is used.

Turning now to FIG. 9, illustrated is an embodiment of the invention where a phase increment other than 90° is used with substantially improved discrimination between the correct state and the neighboring states where the allowable pulse spacings are Tmin/5 and a 78.5° phase difference between adjacent allowed states is used. In FIG. 9 a phase increment other than 90° was chosen to illustrate the substantially improved discrimination between the correct state and the neighboring states for a wide variety of phase angles. Even more important, FIG. 9 illustrates a dramatic improvement as compared to the identical allowed pulse spacing without phase shifts as was illustrated earlier in FIG. 7. The cases of FIG. 7 and FIGS. 8 and 9 have the identical approximate five-fold improvement in the number of states as compared to the more conventional PPM with allowable pulse spacing of Tmin. But, without the phase shifts (FIG. 7) the detection minimum margin is only 0.067 while, with the phase shifts (FIGS. 8&9) the detection margin to adjacent states is now 0.81 which is very similar to the more conventional PPM which has a detection margin approaching unity.

In another embodiment of the present invention, pulse modulation can be characterized by simultaneously shifting both the phase and the time location of a pulse communication signal in a known manner. This embodiment will be henceforth designated as simultaneous phase and time shift keying (PTSK) where keying is the equivalent of modulation. While the discussion herein only considered uniformly spaced time shifts and uniformly spaced phase shifts, those of ordinary skill in the pertinent art will understand that non-uniform spacing of either the time or phase shifts (or both) is within the scope of the present invention.

In this embodiment, a data stream to be transmitted (1) is partitioning into one or more separate sample values; (2) at least one pulse is used to transmit a given sample value; (3) the at least one pulse is transmitted in a span of time that is divided into time slots that are nominally, but not necessarily, adjacent; (4) the collection of time slots comprising the span of time constitutes a group of slots; (5) each slot has a unique phase shift and a unique time location; and (6) the at least one pulse is contained within the group of slots in a predetermined manner to represent the information contained in the separate sample value. Groups can vary in the number of slots and/or in the number of occupied slots and still be within the scope of the present invention. Also, a single group can be defined such that it only has a fixed number of occupied slots or, alternatively, it might allow for a varying number of occupied slots. Also, a single data message could include more than one type of group (for example the header might be one type of group, the actual data a second type of group, and an error detection/correction word might be of a third type). All of these variants have particular usefulness in SAW RFID tags and are all within the intended scope of the present invention.

In another embodiment of the present invention a combined multi-pulse group keying and simultaneous phase and time shift keying (MPG/PTSK) can be implemented. In MPGK multiple pulses were used in one group but Tmin separated the pulse positions. In PTSK only one pulse per group (like conventional PPM) was used, but the allowable pulse positions were allowed to be significantly smaller than Tmin. Combining the two type requires attention to certain subtle details. In the MPGK case, two adjacent slots can both be occupied because, as described above, the skirt of one pulse does not overlap the peak of any neighboring pulses (the same as for conventional PPM as shown in FIG. 5). However, if two adjacent or closely neighboring slots were allowed to be simultaneously occupied when using strongly overlapping pulses (as in FIG. 7), the potential for strong inter-symbol interference would exist between pulses and could result in almost total cancellation between the two where a significant phase shift between pulses is present (e.g., FIGS. 8 and 9). This potential interference must be addressed if the MPGK modulation method is to be successfully combined with the PTSK method.

Figure 10:
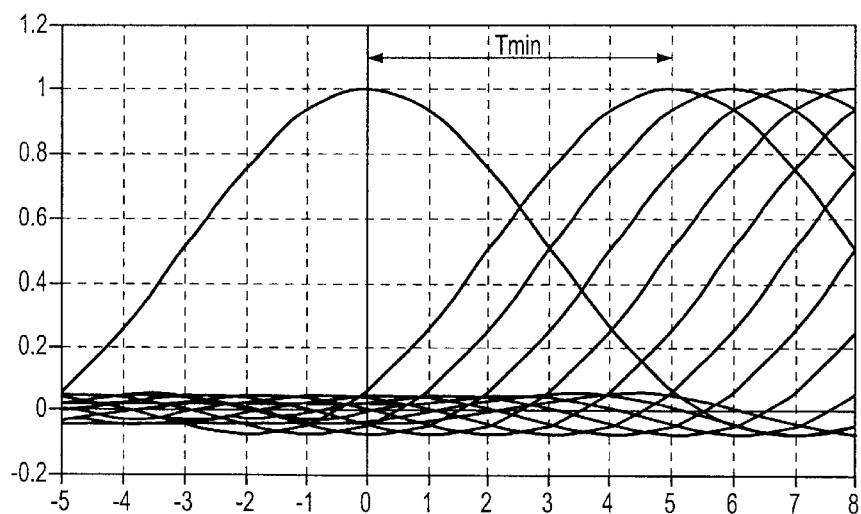
FIG. 10 illustrates an embodiment of a minimum pulse spacing rule that allows using MPGK along with PTSK.

A primary method for solving the interference problem is to impose a minimum pulse spacing rule when using MPGK along with PTSK. One generally useful rule is that while the allowable pulse positions can have time separations that are significantly smaller than Tmin, in a specific waveform any two actual pulses included in that waveform must always have a minimum spacing greater than Tmin. Turning to FIG. 10, illustrated is an embodiment of a minimum pulse spacing rule that allows using MPGK along with PTSK. In this example, one pulse in the waveform is selected to occur at t=0 and, by the minimum pulse spacing rule, the next pulse is excluded from positions t=1, 2, 3, and 4, but is allowed to occur at positions t=5, 6, 7, etc. (Note: the PTSK phase shifts between pulse slots been omitted for clarity.) Note that at least four pulse slots had to be skipped between selected pulses where Tmin is equal to five slots. In a more general case, if a slot width equals Tmin/N then a skip factor can be defined that will equal N−1. Larger skip factors can be used and could be beneficial in certain cases (for example in operating environments with strong outside interference). Somewhat smaller skip factors could also be beneficial in other cases but it appears that assuring a minimum spacing equal to Tmin will likely be the best choice in most circumstances.

Another method for solving the potential interference problem of two adjacent slots being occupied when PTSK is combined with MPGK is based on the orthogonality between adjacent slots that arises if the phase shift between slots is ±90° (see the example given earlier in FIG. 7). If the phase is sufficiently close to ±90°, then a pulse in any given slot will not interfere with either of the two adjacent slots. In this case, all odd numbered slots are totally independent of all even numbered slots. However, a pulse can still interfere with its $2^{nd}$, $4^{th}$, $6^{th}$, etc. nearest neighbors if the spacing of these neighbors is closer than Tmin. In this special "orthogonal nearest neighbor" case, a useful method for analyzing the options is to divide the slots into two intertwined sub-groups (I and Q). Then, if necessary, the Tmin minimum spacing rule illustrated in FIG. 10 is separately applied to each sub-group.

This embodiment of the invention of using PTSK combined with MPGK is generally characterized by a significant overlap between the pulses in neighboring slots. Variants of this embodiment can be derived from the earlier descriptions of PTSK and MPGK. However, the combination of PTSK and MPGK should consider the need for providing a means to avoid the potential inter-symbol interference effects that may arise when using pulses that have significant overlap with neighboring slots. Since this method combines the characteristics of two embodiments previously described in can appropriately be called MPG/PTSK (i.e., combined multi-pulse groups with simultaneous phase and time shift keying).

Even more data can be encoded if pulse amplitude modulation is also used in combination with MPG, PTSK, PPM, or MBG/PTSK. It is apparent to those of ordinary skill in the pertinent art that the invention described herein is intended to cover embodiments that include pulse amplitude modulation, whether used alone or in combination with any other modulation method.

Turning now to FIG. 11, illustrated is a table showing the 286 possible states that exist when three reflectors are used in a group of 21 slots having a skip factor of four. This is an example of a single group where a SAW RFID tag has three reflectors per group, with 21 slots per group, a skip factor of four, and a phase increment between adjacent slots ranging from 75° to 105°. The phase increment between adjacent slots is the same as was described earlier in conjunction with FIGS. 8 and 9. The five-fold overlap between neighboring pulses required a skip factor of four. It is evident that 286 states are sufficient to encode the 256 states that correspond to 8 bits of data. This particular variant has a group size that is almost identical to the one described in FIG. 4 with the same number of data bits. However, it has two major advantages in that it only uses three SAW reflectors instead of four, and second, it is less susceptible to common transmission distortion effects such as short-path multi-path signal transmission and other pulse smearing effects.

Turning now to FIG. 12, illustrated is a table showing the states for a SAW RFID tag with 10 slots, two reflectors and 36 possible placements. This table was taken from a situation where the SAW RFID tag had four reflectors per group, 20 slots per group and a skip factor of three and a phase increment between adjacent slots of plus or minus 90°, where the group is divided into two sub-groups. This example is quite similar to the previous example in which four distinct phase states are divided into two sub-groups of ten slots each. Each sub-group can be treated as having a skip factor of one. The table gives the states corresponding to one such sub-group. The only difference between this example and the previously example is that the two in-phase reflectors (+I & −I) can be of either the same sign or of opposite signs. The major advantage of this example is that with 36 states per sub-group, a total of 10 bits per group can be obtained, which is better than the eight bits in the previous example. The disadvantages of this example are possibly worse spurious reflections than the previous example and the general sensitivity to pulse smearing effects.

Turning now to FIG. 13, illustrated is a table showing one sub-group of states from a SAW RFID tag with four reflectors per group, 20 slots per group, a skip factor of three, a phase increment between adjacent slots ±90° with division into two sub-groups and only one reflector of each specific phase per group. This table is from the previous example in which four distinct phase states are used that divide into two sub-groups of 10 slots each where each sub-group has a skip factor of one. Only one reflector of each specific phase is used in each group.

In one embodiment of the invention, the SAW identification tag reader detects a return signal generated by a SAW identification tag and decodes a number that is at least eight bits long. In still another embodiment, the reader decodes a SAW identification tag with four groups of slots and an encoded number that is at least 32 bits long. In yet still another embodiment of the invention, the SAW identification tag has twelve groups of slots and encodes a number at least 64 bits long. Those skilled in the pertinent art will understand that, regardless of the number of groups, slots or the bit length of a number that can be encoded on a SAW identification tag, any embodiment of a SAW identification reader of the type described herein is within the intended scope of the present invention.

The present invention has introduced a SAW identification tag reader for use with SAW identification tags upon which can be encoded substantial data, largely because a signal can be returned having an encoded number using both phase position and pulse position modulation. This dramatically increased data carrying capacity permits SAW identification tags to each have a globally unique number encoded thereon. Because a globally unique number can be encoded on them, SAW identification tags can be used to reliably identify and track an unprecedented number of unique objects. In one embodiment, the SAW identification tag number contains data pertaining to an object associated with the number. This permits, for example, a centralized number allocation authority to assign a group of numbers to a specific industry so that the industry can allocate such numbers to specific applications within that industry. The automotive industry may, for example, be allocated all numbers where the third and fourth digits are a nine and a one. The automobile industry can then assign further numbers following the fifth number as its own standards may dictate. Regardless of how the numbers are assigned by the automobile industry, any object having a SAW identification tag identified by a SAW identification tag reader, as described herein, that has a nine for the third digit and a one for the fourth digit will be identified as associated with the automotive industry.

In another embodiment of the invention, the SAW identification tag number includes an error detection portion. The error detection portion may further be capable of error correction to at least some extent. Of course, error detection or correction is not required in the broad scope of the present invention.

In still another embodiment of the invention, the SAW identification tag reader uses an interrogation signal with a frequency of between two and three gigahertz. A particularly advantageous application of this embodiment provides for the SAW identification tag reader to use a 2.45 gigahertz frequency.

Figure 14A:
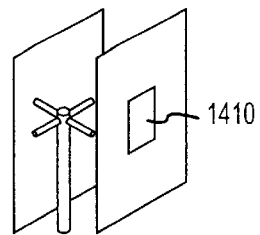
FIGS. 14A–14I illustrate various embodiments of SAW identification tag readers constructed in accordance with the present invention.

Turning now to FIGS. 14A–14I, illustrated are various embodiments of SAW identification tag readers constructed in accordance with the present invention. FIG. 14A illustrates a side panel reader 1410 that can be installed, for example, in a turnstile admitting patrons to a sporting event or in side panels to warehouse doors. The side panel reader 1410 can then read the SAW identification tag number on a SAW identification tag embedded in or associated with an admission ticket to determine the validity of a patron's ticket or in arriving or departing cargo to keep track of the contents of a warehouse.

Figure 14B:
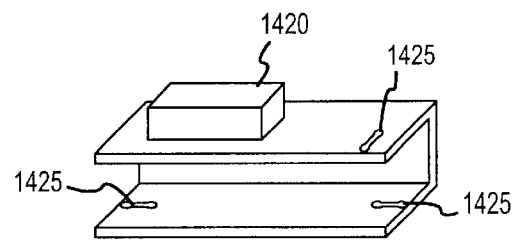

FIG. 14B illustrates a shelf reader 1420 appropriate for installation in locations where space prohibits the use of a larger reader or where a larger reader would be inappropriate. For example, a shelf reader can be used in a doctor's office to unobtrusively keep track of patient files with associated SAW identification tags. A shelf reader 1420 may have several nodes 1425 so that one reader 1420 can be used to monitor different areas, such as a security system where nodes 1425 are used to monitor multiple doors but a single reader 1420 can be used at a centralized location.

Figure 14D:
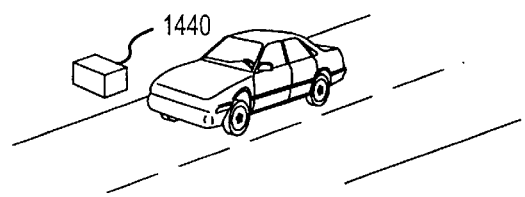
Figure 14C:
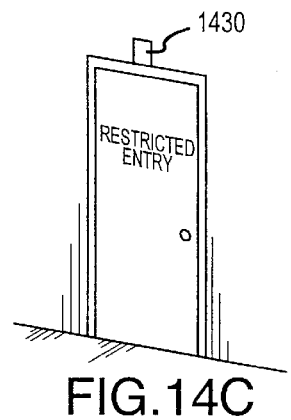

FIG. 14C illustrates a doorway reader 1430. A doorway reader 1430 can be installed in a number of locations. One such location would be in a workplace setting where only certain employees are permitted to access certain locations. The doorway reader 1430 could be used to monitor such a location by reading SAW identification tags embedded in identification badges worn by such employees.

FIG. 14D illustrates a roadway reader 1440. Such a reader 1440 would be useful if SAW identification tags were associated with vehicle license plates. A roadway reader 1440 could then be installed in appropriate locations and used for such things as traffic counts. A roadway reader 1440 could also be used for toll collection in a manner similar to the way toll tags are currently being used.

Figure 14E:
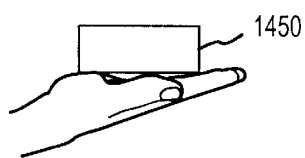

FIG. 14E illustrates short range hand-held reader 1450 useful for a number of applications such as, for example, conducting inventory or part counts. An inexpensive short range hand-held reader 1450 would also be useful for a home SAW tag identification system to keep track of groceries, tools, books, collectibles, etc.

Figure 14F:
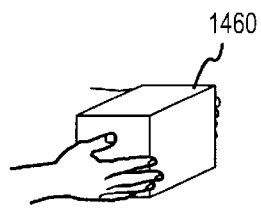

FIG. 14F illustrates a long range hand-held reader 1460. Such a reader 1460 would be useful where the user could not get close to an object. Such a use could, for example, be reading a SAW identification tag on an object located in a hazardous environment.

Figure 14G:
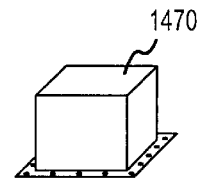

FIG. 14G illustrates a long range fixed reader 1470 appropriate for installation in a fixed location. Such a reader 1470 would be appropriate for installation on an assembly line to identify parts and track parts, for example.

Figure 14H:
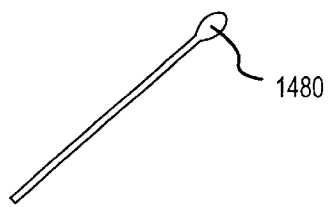

FIG. 14H illustrates a wand reader 1480. Such a reader 1480 can be usefully employed to identify items that are obscured or can not be reached by any other reader type. It could be used to identify, for example, a part located within a machine that could not otherwise be identified without disassembling the entire machine such as an airplane part.

Figure 14I:
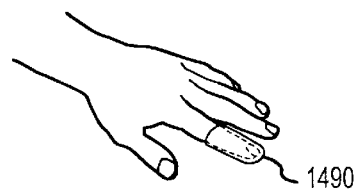

FIG. 14I illustrates a fingertip reader 1490. Such a reader 1490 can be useful to workers for identifying work piece items. It could also be usefully employed on a pick and place assembly machine to identify parts.

There are a number of different businesses that have a need for identifying specific objects with particularity that will find some embodiment of the present invention useful. It is intended that all SAW identification tag readers, whether described herein or not and whether now known or subsequently discovered, be within the scope of the present invention. In short, regardless of reader differences or differences in SAW identification tag design, those skilled in the art will understand that the intended scope of the present invention covers all configurations of SAW identification tag readers constructed in accordance with the principles set forth herein.

Figure 15:
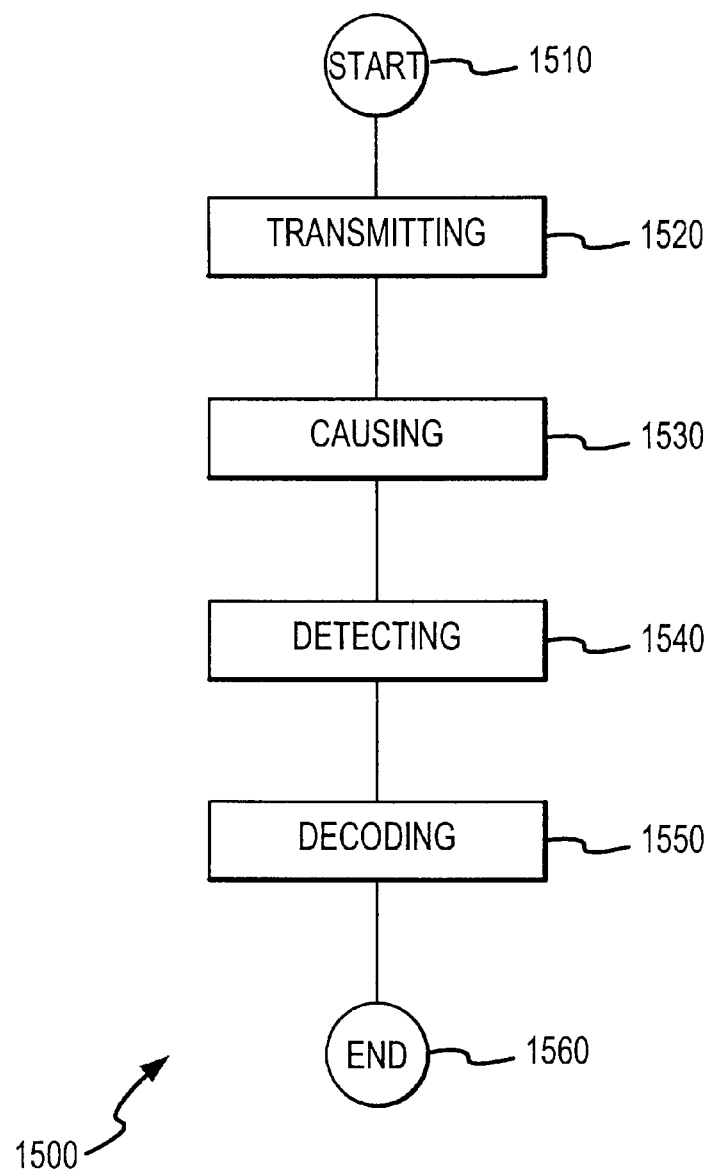
FIG. 15 illustrates a block diagram of a method of operating a SAW identification tag reader.

Turning now to FIG. 15, illustrated is a block diagram of a method 1500 of operating a SAW identification tag reader. The method commences with a start step 1510. In a transmitting step 1520, an interrogation signal is transmitted to excite a SAW transducer located on a piezoelectric substrate that has a group of slots arranged by both pulse position and phase position. In a causing step 1530, the SAW is caused to reflect from a number of reflectors located on the piezoelectric substrate and distributed among the slots thereon such that a return signal to the transducer is generated having a number encoded therein by both pulse position and phase position. In a detecting step 1540 the reader detects the return signal with a receiver. In a decoding step 1550 the reader decodes the SAW identification tag number. The method 1500 concludes with an end step 1560. Of course, any type of interrogation signal transmission that generates a response from a SAW identification is within the scope of the present invention. Such other types may include, without being limited to, a second transducer on a substrate that detects a signal and generates a return signal in response thereto.

Several other embodiments of a method of operating a SAW identification tag reader are within the intended scope of the present invention. The descriptions of the various embodiments of a SAW identification tag reader set forth herein are sufficiently detailed so as to enable one skilled in the pertinent art to understand and practice such other embodiments of a method of operating a SAW identification tag reader.

Figure 16:
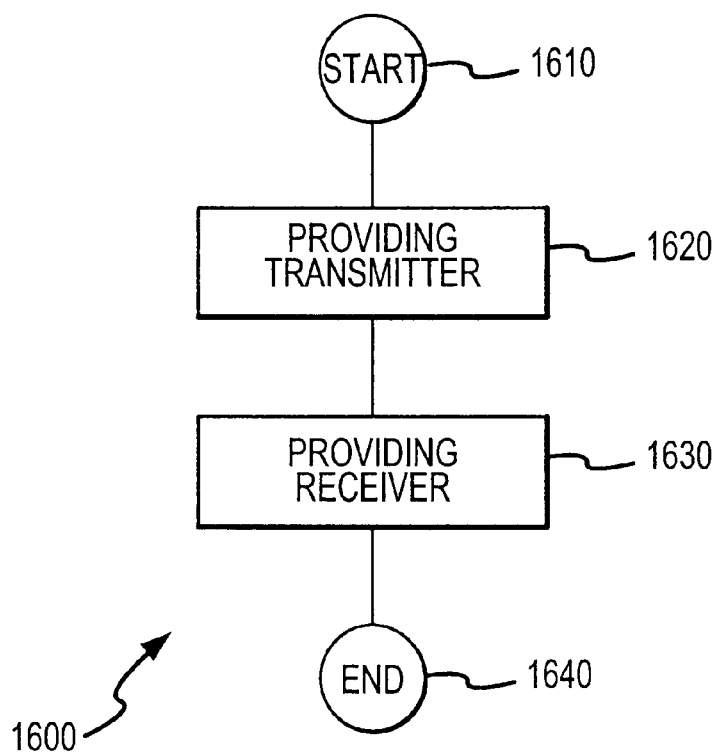
FIG. 16 illustrates a block diagram of a method of manufacturing a SAW identification tag reader.

Turning now to FIG. 16, illustrated is a block diagram of a method 1600 of manufacturing a SAW identification tag reader. The method 1600 commences with a start step 1610. In a providing transmitter step 1620, a transmitter is provided that is capable of sending an interrogation signal to excite a SAW transducer located on a piezoelectric substrate to create a SAW. The piezoelectric substrate has a group of slots thereon that are arranged by both pulse position and phase position. The piezoelectric substrate also has a number of reflectors distributed among the slots by both pulse position and phase position. These reflectors provide a return signal to the transducer that has a number encoded therein by both pulse position and phase position. In a providing receiver step 1630, a receiver for detecting a return signal and decoding the number encoded therein is provided. The method 1600 concludes with an end step 1640.

Several other embodiments of a method of manufacturing a SAW identification tag reader are within the intended scope of the present invention. The descriptions of the various embodiments of a SAW identification tag reader set forth herein are sufficiently detailed so as to enable one skilled in the pertinent art to understand and practice such other embodiments.

Although the present invention has been described in detail, those skilled in the art should understand that they can make various changes, substitutions and alterations herein without departing from the spirit and scope of the invention in its broadest form.

What is claimed is:

1. A surface acoustic wave (SAW) identification tag reader, comprising:
   a transmitter capable of sending an interrogation signal that excites a SAW transducer located on a piezoelectric substrate, said piezoelectric substrate having a group of slots arranged by both pulse position and phase position, and a number of reflectors distributed among said slots such that said reflectors return to said transducer a return signal containing a number encoded by both pulse position and phase position; and
   a receiver for detecting said return signal and decoding said number.

2. The SAW identification tag reader as recited in claim 1 wherein said reflectors are arranged such that said phase position is in quadrature.

3. The SAW identification tag reader as recited in claim 1 further comprising a framing reflector located between said SAW transducer and said group.

4. The SAW identification tag reader as recited in claim 1 further comprising a plurality of said groups separated by dead spaces.

5. The SAW identification tag reader as recited in claim 4 wherein said plurality of groups is at least four and said number is at least 32 bits long.

6. The SAW identification tag reader as recited in claim 4 wherein said plurality of groups is at least twelve and said number is at least 64 bits long.

7. The SAW identification tag reader as recited in claim 1 wherein said number is at least eight bits long.

8. The SAW identification tag reader as recited in claim 1 wherein said interrogation signal has a frequency of between two and three gigahertz.

9. The SAW identification tag reader as recited in claim 1 wherein said number contains data pertaining to an object associated with said number.

10. The SAW identification tag reader as recited in claim 1 further comprising a computer associated with said SAW identification tag reader.

11. The SAW identification tag reader as recited in claim 1 further comprising a computer network associated with said SAW identification tag reader.

12. The SAW identification tag reader as recited in claim 1 wherein said SAW identification tag reader is selected from the group consisting of:
- a side panel reader,
- a shelf reader,
- a doorway reader,
- a roadway reader,
- a short range hand-held reader,
- a long range hand-held reader,
- a long range fixed reader,
- a wand reader, and
- a fingertip reader.

13. A method of operating a surface acoustic wave (SAW) identification tag reader, comprising:
- transmitting an interrogation signal to excite a SAW transducer located on a piezoelectric substrate to create a SAW, said piezoelectric substrate having a group of slots arranged by both pulse position and phase position;
- causing said SAW to reflect from a number of reflectors located on said piezoelectric substrate, said number of reflectors distributed among said slots such that said reflector return to said transducer a return signal containing a number encoded by both pulse position and phase position;
- detecting said return signal with a receiver; and
- decoding said number.

14. The method as recited in claim 13 wherein said reflectors are arranged such that said phase position is in quadrature.

15. The method as recited in claim 13 further comprising causing said SAW to reflect from a framing reflector located between said SAW transducer and said group.

16. The method as recited in claim 13 further comprising a plurality of said groups separated by dead spaces.

17. The method as recited in claim 16 wherein said plurality of groups is at least four and said number is at least 32 bits long.

18. The method as recited in claim 16 wherein said plurality of groups is at least twelve and said number is at least 64 bits long.

19. The method as recited in claim 13 wherein said number is at least eight bits long.

20. The method as recited in claim 13 wherein said SAW has a frequency of between two and three gigahertz.

21. The method as recited in claim 13 wherein said number contains data pertaining to an object associated with said number.

22. The method as recited in claim 13 further comprising associating a computer with said SAW identification tag reader.

23. The method as recited in claim 13 further comprising associating a computer network with said SAW identification tag reader.

24. The method as recited in claim 13 wherein said SAW identification tag reader is selected from the group consisting of:
- a side panel reader,
- a shelf reader,
- a doorway reader,
- a roadway reader,
- a short range hand-held reader,
- a long range hand-held reader,
- a long range fixed reader,
- a wand reader, and
- a fingertip reader.

25. A method of manufacturing a surface acoustic wave (SAW) identification tag reader, comprising:
- providing a transmitter capable of sending an interrogation signal that excites a SAW transducer located on a piezoelectric substrate to create a SAW, said piezoelectric substrate having a group of slots arranged by both pulse position and phase position, and a number of reflectors distributed among said slots such that said reflectors return to said transducer a return signal containing a number encoded by both pulse position and phase position; and
- providing a receiver for detecting said return signal and decoding said number.

26. The method as recited in claim 25 wherein said reflectors are arranged such that said phase position is in quadrature.

27. The method as recited in claim 25 further comprising forming a framing reflector between said SAW transducer and said group.

28. The method as recited in claim 25 further comprising forming a plurality of said groups separated by dead spaces.

29. The method as recited in claim 28 wherein said plurality of groups is at least four and said number is at least 32 bits long.

30. The method as recited in claim 28 wherein said plurality of groups is at least twelve and said number is at least 64 bits long.

31. The method as recited in claim 25 wherein said number is at least eight bits long.

32. The method as recited in claim 25 wherein said SAW has a frequency of between two and three gigahertz.

33. The method as recited in claim 25 wherein said number contains data pertaining to an object associated with said number.

34. The method as recited in claim 25 wherein said SAW identification tag reader is selected from the group consisting of:
- a side panel reader,
- a shelf reader,
- a doorway reader,
- a roadway reader,
- a short range hand-held reader,
- a long range hand-held reader,
- a long range fixed reader,
- a wand reader, and
- a fingertip reader.

* * * * *